J. M. SHUCK.
Bee-Feeder.

No. 204,767. Patented June 11, 1878.

Witnesses.
J. W. Hillis
W. H. Waers

Inventor.
John M. Shuck

UNITED STATES PATENT OFFICE.

JOHN M. SHUCK, OF DES MOINES, IOWA.

IMPROVEMENT IN BEE-FEEDERS.

Specification forming part of Letters Patent No. 204,767, dated June 11, 1878; application filed March 20, 1878.

*To all whom it may concern:*

Be it known that I, JOHN M. SHUCK, of Des Moines, in the county of Polk and State of Iowa, have invented a new and useful Improvement in Bee-Feeders, of which the following is a specification:

The object of my invention is to facilitate the feeding of bees at seasons of the year when they might otherwise suffer from want of food.

My invention is preferably made of wood and wire-cloth, and consists of a series of troughs or vessels to hold the food for the bees; of a casing to exclude all bees on the outside of the hive from gaining access to the series of troughs or vessels containing the food; of an aperture or opening in the top of the casing through which food is supplied; of a screen or guard so arranged as to prevent the bees flying out and annoying the bee-keeper when replenishing the troughs with food; and of a lid or cover for the supply-opening in the top casing, secured by a screw or in any other suitable way.

Figure 1:
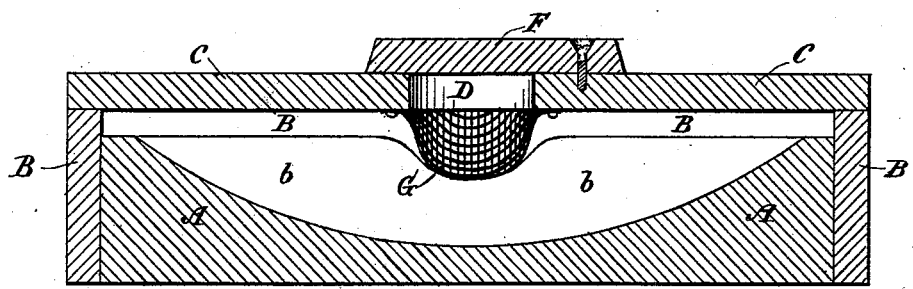

Figure 1 of my drawings is a longitudinal, vertical, and central section of my bee-feeder. A represents the block of wood in which the series of troughs or vessels are cut to contain the feed, and is two inches wide, two inches thick, and twelve inches long. B represents the casing at the back of the block A, and rising above it one-half inch; also, at the ends of the block A, and rising above it one-half inch, and projecting beyond the front of it one-half inch, to allow the bees to pass from the hive to the series of vessels holding the food. C represents the top casing, of a sufficient size to completely cover the back and end casings B. D represents the opening in the top casing C, through which the food is supplied, and is one and a quarter inch in diameter. F represents the lid or cover for the opening D. G represents the screen or guard of wire-cloth attached to the under side of the top casing C in such a manner as to prevent the bees passing out through the opening D when the feeder is opened.

Figure 2:
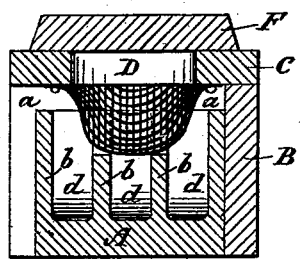

Fig. 2 is a transverse section of my bee-feeder. *a* represents the passage-way for the bees from the interior of the hive to the food. *d* represents the series of troughs or vessels, one-half inch wide, one and three-fourths inch deep, and eleven inches long, cut into the block of wood A. *b* represents the divisions or partitions between the troughs *d*, to which the bees cling while taking food, and are thus prevented from drowning.

Figure 3:
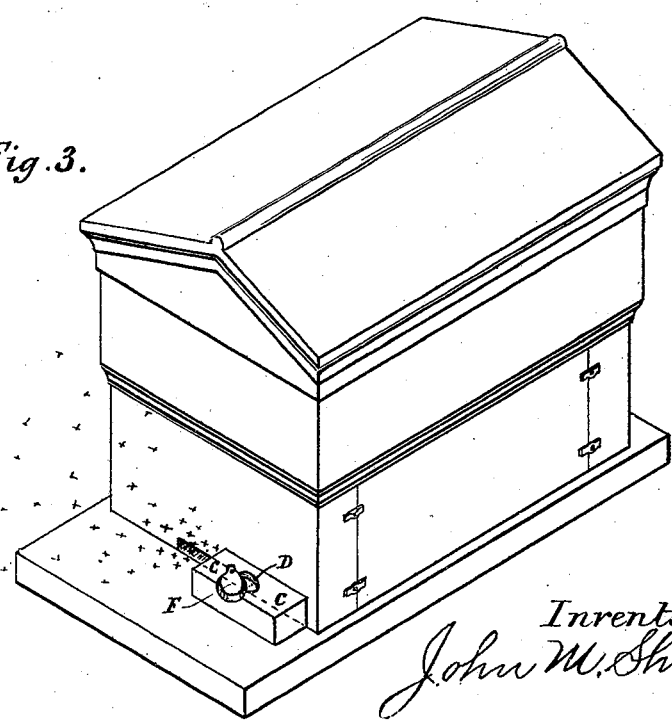

Fig. 3 is a perspective view of my complete bee-feeder, represented in place at the front entrance of a bee-hive, open for the admission of bee-food.

In the practical operation of my bee-feeder it is placed against the entrance to the hive in such a position as to either wholly confine the bees to the hive when feeding or to allow only a few bees to pass at once. The cover F is then turned so as to expose the opening D in the top casing C, and the food is poured from a spouted vessel through the screen or guard G into the series of vessels *d*. The opening D is then closed by the cover F, and the food is secure from all bees outside the hive.

I claim as my invention—

The series of troughs or vessels *d*, separated by the partitions *b*, the casings B and C, the screen or guard G, the opening D, and the lid or cover F, in combination with each other, substantially as described, and for the purposes shown and specified.

JOHN M. SHUCK.

Witnesses:
J. W. HILLIS,
W. H. WAERS.